United States Patent
Ma et al.

(10) Patent No.: US 10,024,996 B2
(45) Date of Patent: Jul. 17, 2018

(54) COLLOCATED COIL ANTENNAS INCORPORATING A SYMMETRIC SOFT MAGNETIC BAND

(71) Applicant: Halliburton Energy Services, Inc., Houston, TX (US)

(72) Inventors: Jin Ma, Singapore (SG); Glenn Andrew Wilson, Singapore (SG); Burkay Donderici, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/116,325

(22) PCT Filed: Oct. 12, 2015

(86) PCT No.: PCT/US2015/055069
§ 371 (c)(1),
(2) Date: Aug. 3, 2016

(87) PCT Pub. No.: WO2017/065721
PCT Pub. Date: Apr. 20, 2017

(65) Prior Publication Data
US 2017/0269254 A1    Sep. 21, 2017

(51) Int. Cl.
*E21B 49/00* (2006.01)
*G01V 3/28* (2006.01)
*E21B 47/12* (2012.01)

(52) U.S. Cl.
CPC ............... *G01V 3/28* (2013.01); *E21B 49/00* (2013.01); *E21B 47/12* (2013.01)

(58) Field of Classification Search
CPC .................................. G01V 3/28; E21B 17/20
See application file for complete search history.

(56) References Cited

U.S. PATENT DOCUMENTS

| | | |
|---|---|---|
| 5,530,358 A | 6/1996 | Wisler et al. |
| 6,215,304 B1 | 4/2001 | Slade |
| 6,710,600 B1 | 3/2004 | Kopecki et al. |
| 7,098,858 B2 | 8/2006 | Bittar et al. |
| 7,301,429 B1 | 11/2007 | Hall et al. |
| 7,436,183 B2 | 10/2008 | Clark |
| 7,525,315 B2 | 4/2009 | Fredette et al. |

(Continued)

FOREIGN PATENT DOCUMENTS

| | | |
|---|---|---|
| WO | 2008036557 A2 | 3/2008 |
| WO | 2010111352 A2 | 9/2010 |

OTHER PUBLICATIONS

ISR/WO for PCT/US2015/055069 dated Jun. 30, 2016.

*Primary Examiner* — D. Andrews
*Assistant Examiner* — Dany E Akakpo
(74) *Attorney, Agent, or Firm* — McDermott Will & Emery LLP

(57) ABSTRACT

An antenna assembly includes a tool mandrel having a tool axis, and a plurality of coils are collocated about the tool mandrel and each include a plurality of windings wrapped about the tool mandrel. A soft magnetic band radially interposes the plurality of coils and the tool mandrel and includes a plurality of inserts that form two or more annular arrays axially spaced from each other and extend about the tool mandrel at an angle orthogonal to the tool axis. The inserts in each annular array are circumferentially spaced from each other.

20 Claims, 13 Drawing Sheets

(56) References Cited

U.S. PATENT DOCUMENTS

| | | | |
|---|---|---|---|
| 7,839,149 B2 | 11/2010 | Wang et al. | |
| 8,207,738 B2 | 6/2012 | Wang | |
| 8,264,228 B2 | 9/2012 | Bittar et al. | |
| 8,378,908 B2 | 2/2013 | Wisler et al. | |
| 8,471,563 B2 | 6/2013 | Wisler et al. | |
| 2004/0066194 A1 | 4/2004 | Slade et al. | |
| 2004/0183538 A1 | 9/2004 | Hanstein et al. | |
| 2008/0068023 A1* | 3/2008 | Peter | G01V 3/30 324/338 |
| 2010/0244841 A1* | 9/2010 | Wang | E21B 47/102 324/333 |
| 2013/0032404 A1 | 2/2013 | Donderici et al. | |
| 2013/0191028 A1 | 7/2013 | Homan et al. | |
| 2013/0239673 A1 | 9/2013 | Garcia-Osuna et al. | |
| 2014/0292341 A1 | 10/2014 | Yang | |
| 2015/0268372 A1* | 9/2015 | Davydychev | G01V 3/28 324/339 |

* cited by examiner

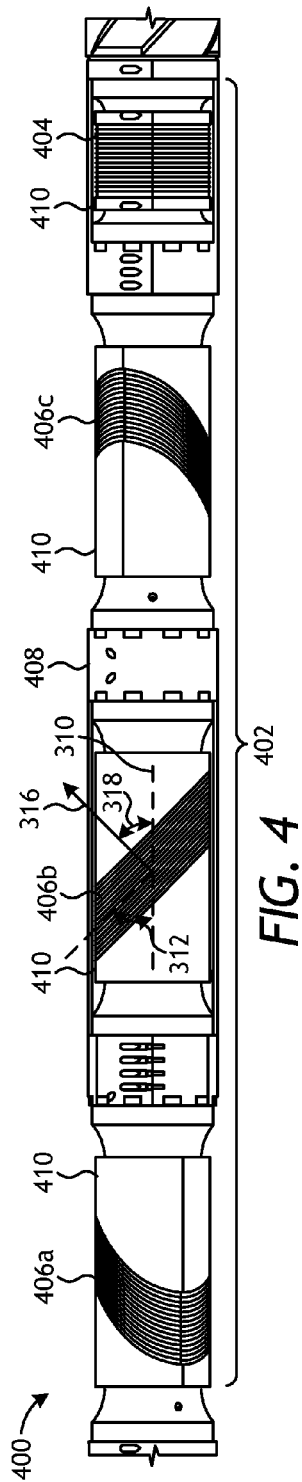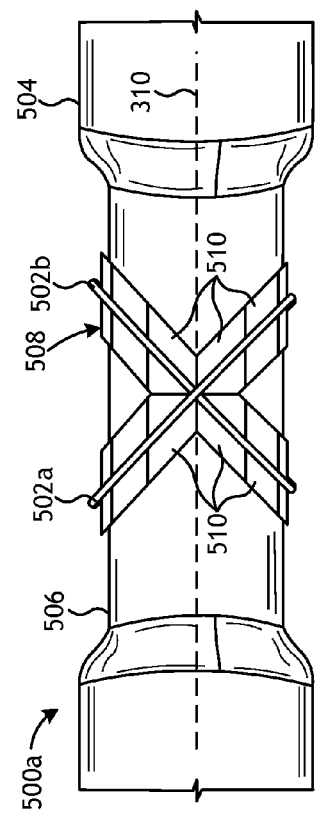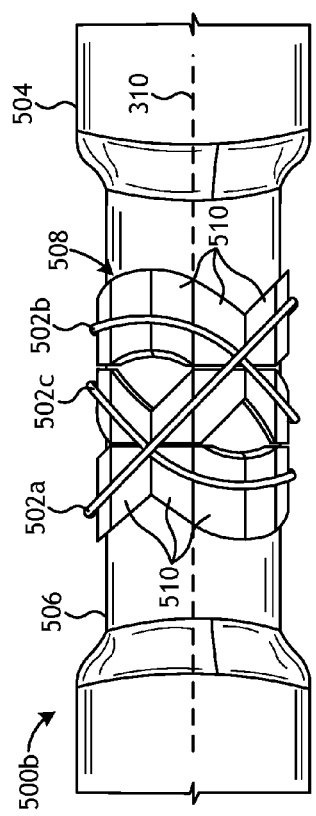

COLLOCATED COIL ANTENNAS INCORPORATING A SYMMETRIC SOFT MAGNETIC BAND

BACKGROUND

During drilling operations for the extraction of hydrocarbons, a variety of measurement and transmission techniques are used to provide or record real-time data from the vicinity of a drill bit or within a wellbore following a drilling operation. Measurements of surrounding subterranean formations may be made throughout drilling operations using downhole measurement and logging tools, such as measurement-while-drilling (MWD) and/or logging-while-drilling (LWD) tools, which help characterize the formations and aid in making operational decisions. More particularly, such wellbore logging tools make measurements used to determine the electrical resistivity (or its inverse, conductivity) of the surrounding subterranean formations being penetrated, where the electrical resistivity indicates various geological features of the formations.

Downhole resistivity measurements may be taken using one or more antennas coupled to or otherwise associated with the wellbore logging tools. Logging tool antennas are often formed by positioning coil windings about an axial section of the wellbore logging tool, such as a drill collar. A soft magnetic material is sometimes positioned beneath the coil windings to increase the efficiency and/or sensitivity of the logging tool antenna. The soft magnetic material facilitates a higher magnetic permeability path (i.e., a flux conduit) for the magnetic field generated by the coil windings and helps shield the coil windings from adjacent drill collars and associated losses (e.g., eddy currents generated on the drill collars).

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 4 is a side view of another exemplary resistivity logging tool.

FIGS. 5A and 5B are side views of exemplary collocated antenna assemblies.

Figure 6A:
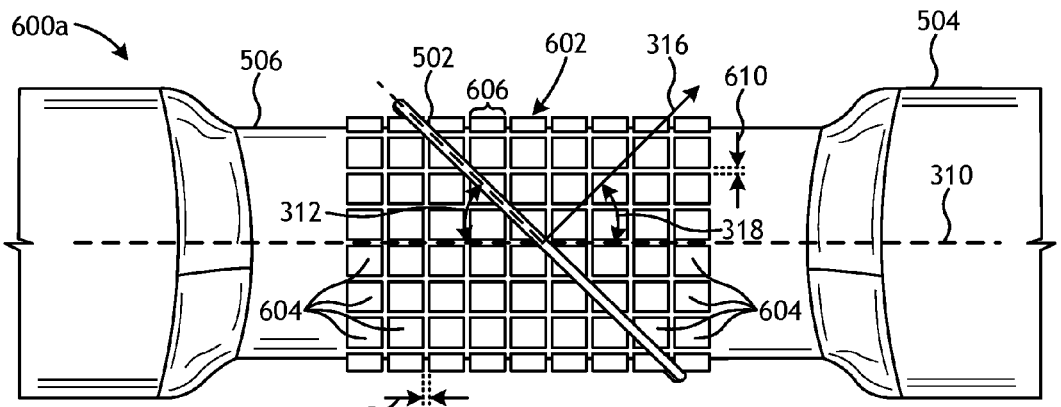
FIGS. 6A-6C are side views of exemplary collocated antenna assemblies that employ the principles of the present disclosure.
Figure 6B:
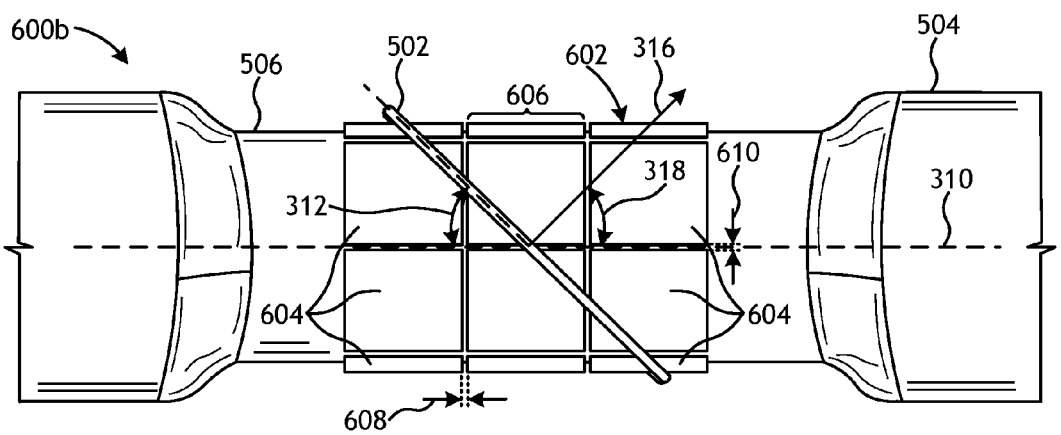
Figure 6C:
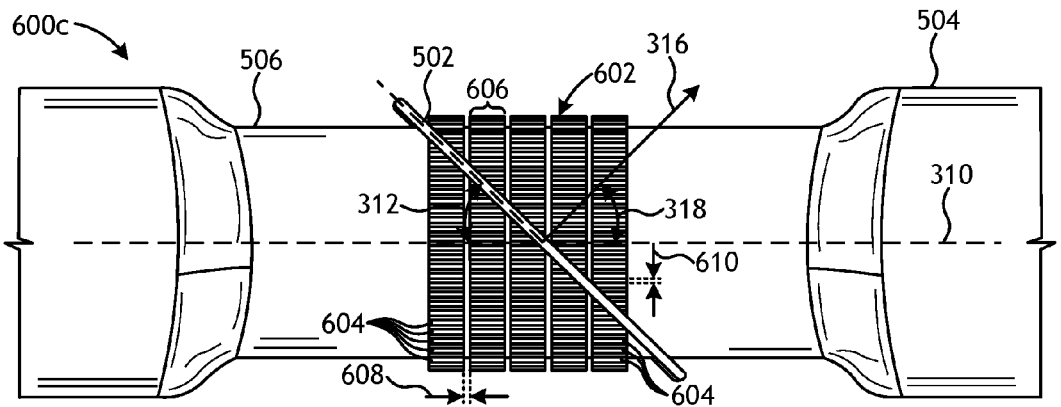

9A-9C are plots showing a simulated response of the near-field gain of the coil from each antenna assembly of FIGS. 6A-6C, respectively, upon being excited.

Figure 10A:
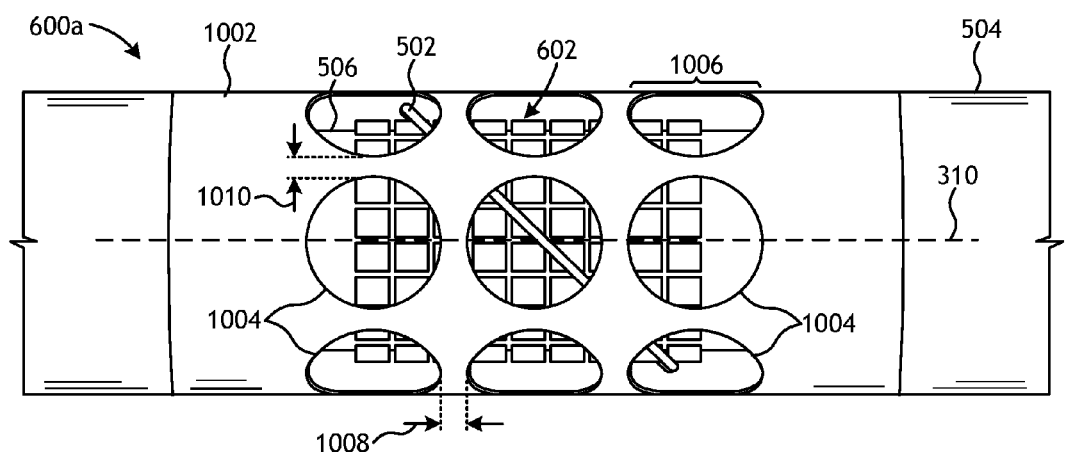
Figure 10B:
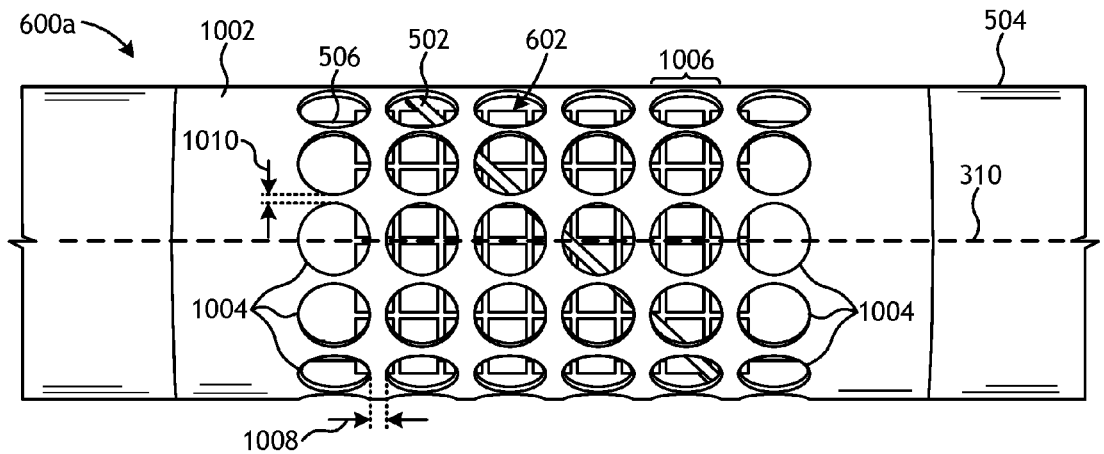

FIGS. 10A and 10B are side views of additional exemplary embodiments of the antenna assembly of FIG. 6A.

Figure 11A:
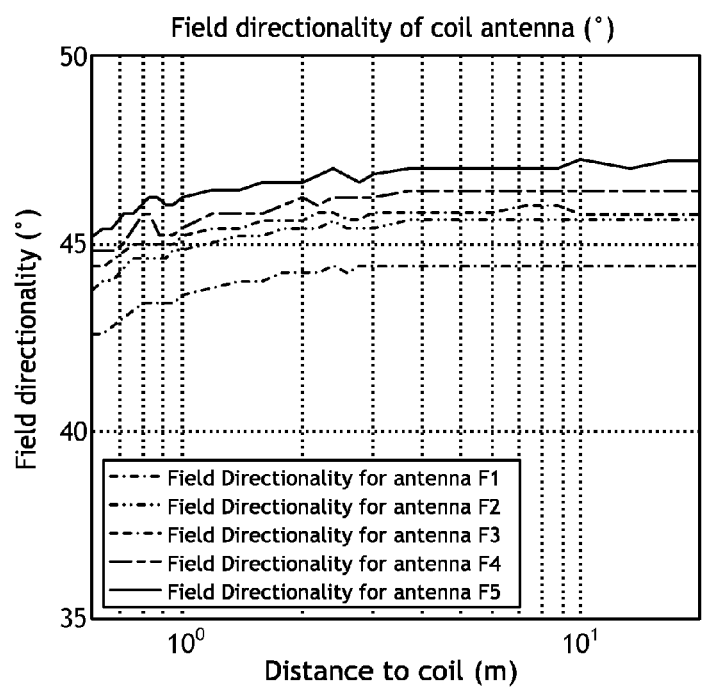
Figure 11B:
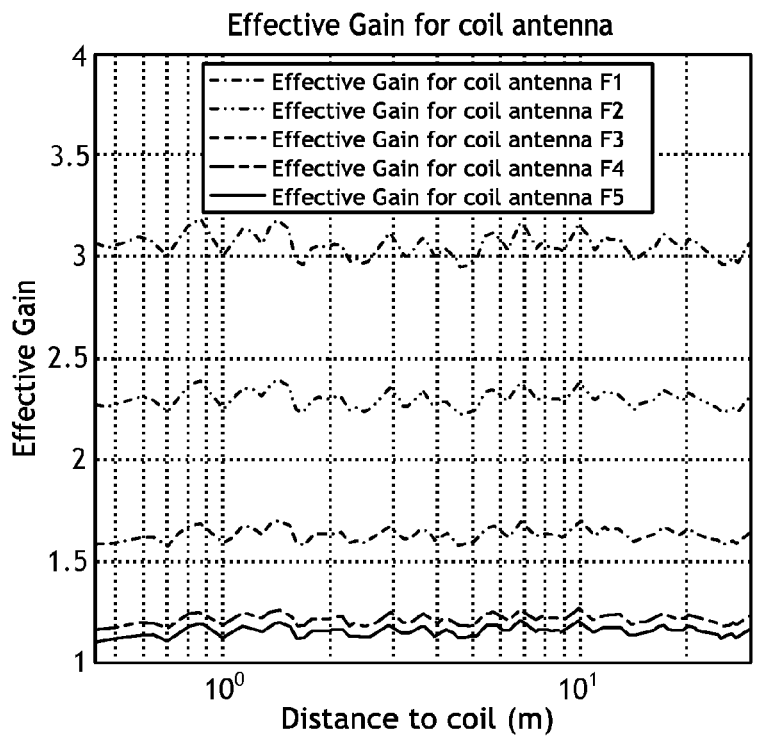

FIGS. 11A and 11B are plots showing a simulated response of the directionality of the magnetic dipole moment of the coil from the antenna assemblies of FIGS. 10A and 10B, respectively, upon being excited.

Figure 12A:
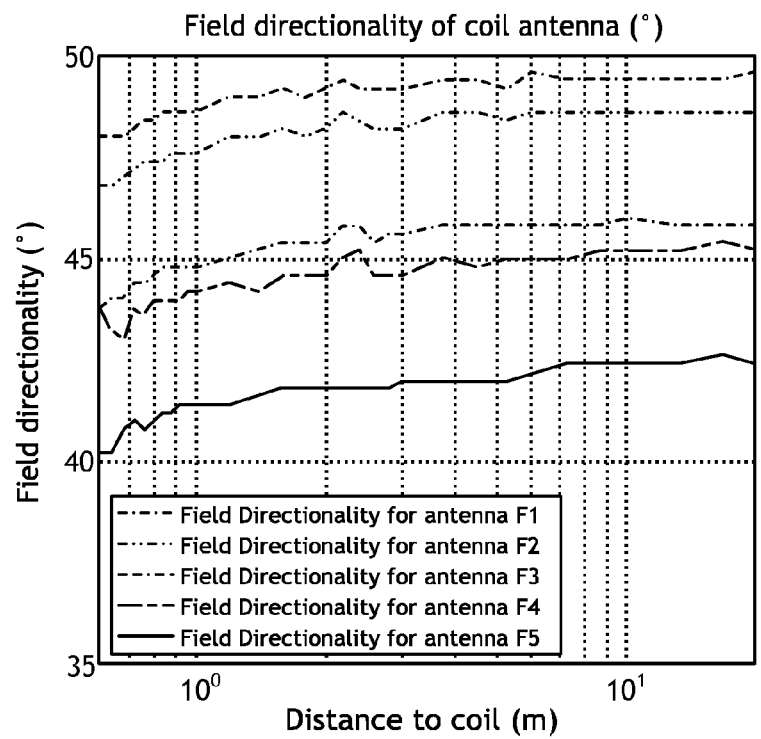
Figure 12B:
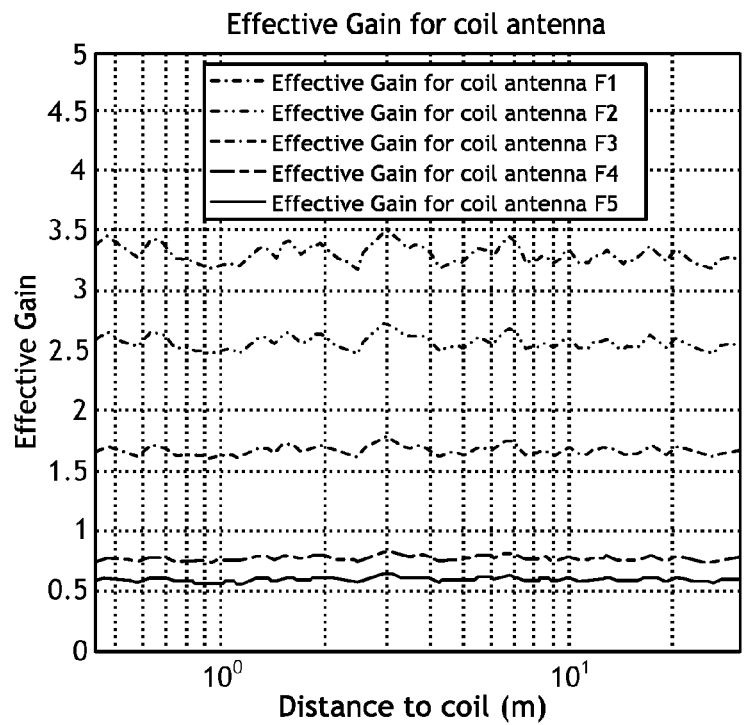

FIGS. 12A and 12B are plots showing a simulated response of the near-field gain of the coil from each antenna assembly of FIGS. 10A and 10B, respectively, upon being excited.

Figure 13:
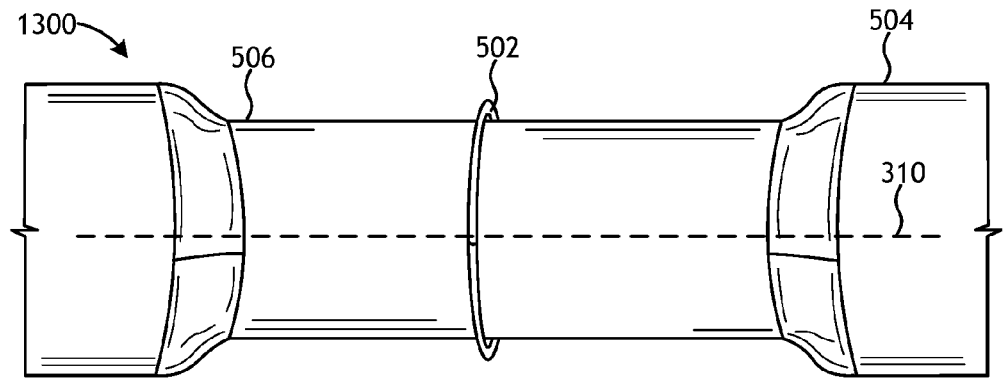

FIG. 13 depicts another antenna assembly that will be used as a reference model.

Figure 14A:
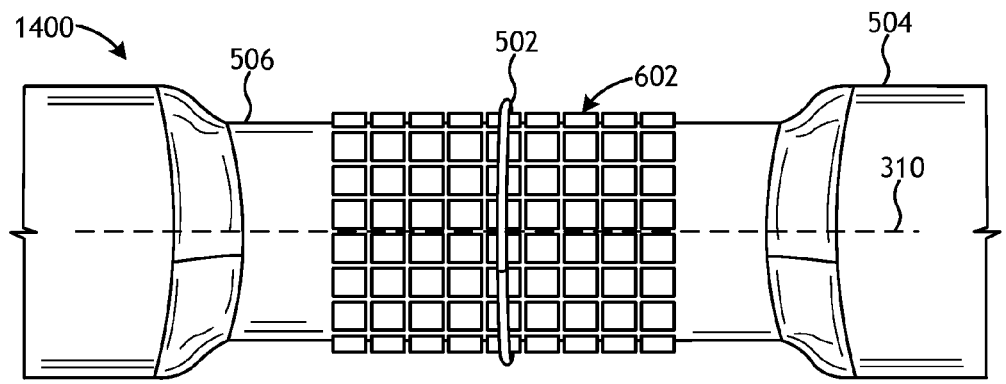

FIG. 14A is a side view of another exemplary antenna assembly 1400 that employs the principles of the present disclosure according to one or more embodiments.

Figure 14B:
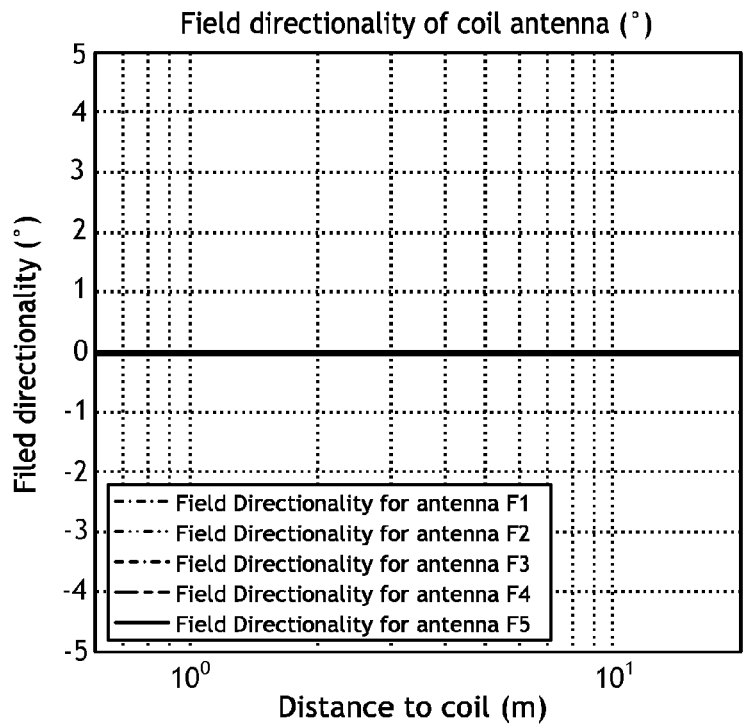
Figure 14C:
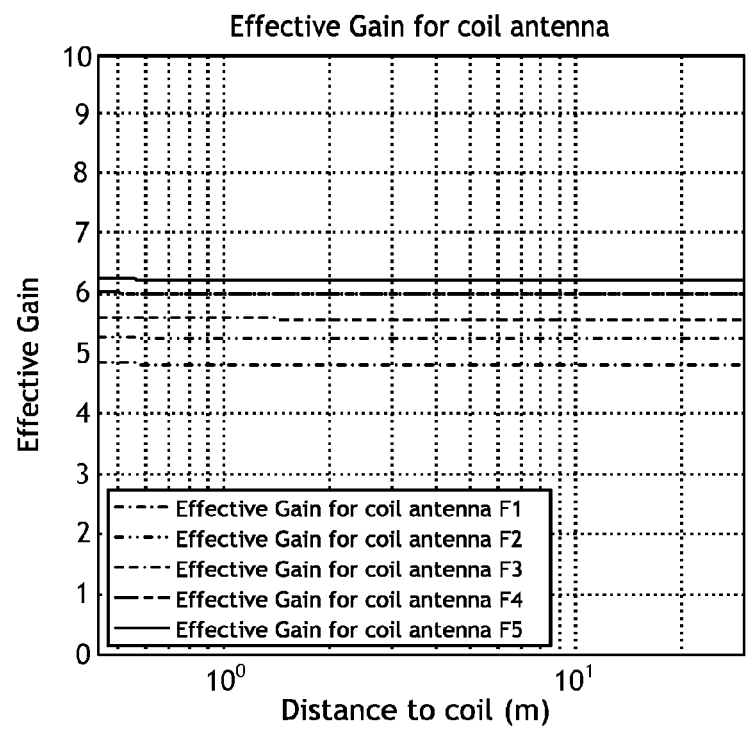

FIGS. 14B and 14C are plots showing simulated responses of the directionality of the magnetic dipole moment and the near-field gain of the coil from the antenna assembly of FIG. 14A.

DETAILED DESCRIPTION

The present disclosure relates generally to wellbore logging tools used in the oil and gas industry and, more particularly, to the design of resistivity logging tools having a symmetric soft magnetic band interposing collocated coil antennas.

Embodiments of the present disclosure describe improvements to the design of antenna assemblies used in resistivity logging tools for monitoring surrounding subterranean formations adjacent a drilled wellbore. The antenna assemblies described herein include collocated tilted and coaxial coil antennas that include a symmetric soft magnetic band to increase the inductance of the coil antennas. The soft magnetic band improves collocated tilted coil directionality and gain with geometrically simple inserts that are easy and inexpensive to manufacture. The inserts are symmetrically spaced in both the axial and azimuthal directions and, as a result, the soft magnetic band may be characterized as being azimuthally free or azimuthally invariant and, therefore, azimuthally equivalent to the coil antennas. Antenna assemblies that incorporate the symmetric soft magnet band can preserve the physical tilt angle of the coil transmitter collocated at any azimuthal angle, without needing to compromise physical orientations of the coil windings or inserts. Moreover, antenna assemblies that incorporate the symmetric soft magnet band can preserve the effective tilt angle for both tilted coil and coaxial coil.

Figure 1:
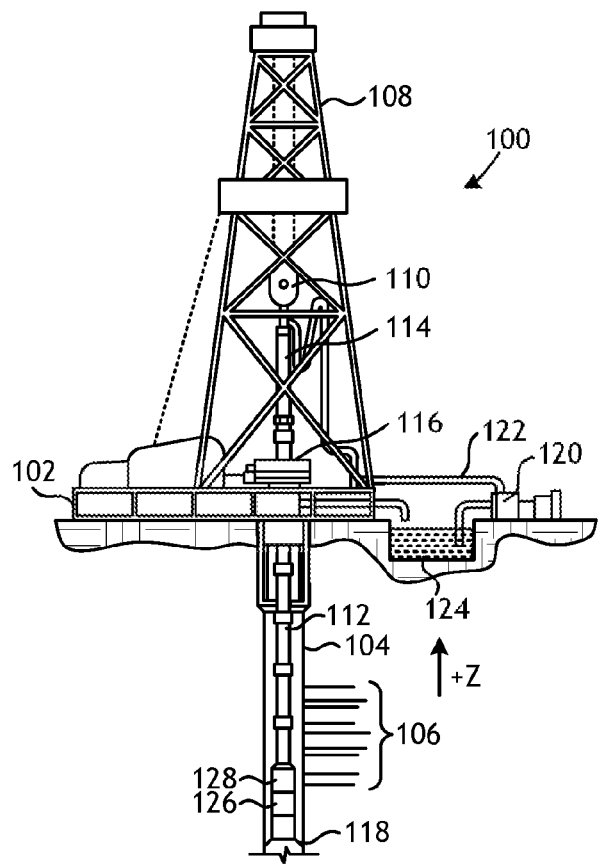
FIG. 1 is a schematic diagram of an exemplary drilling system that may employ the principles of the present disclosure.

FIG. 1 is a schematic diagram of an exemplary drilling system 100 that may employ the principles of the present disclosure, according to one or more embodiments. As illustrated, the drilling system 100 may include a drilling platform 102 positioned at the surface and a wellbore 104 that extends from the drilling platform 102 into one or more subterranean formations 106. In other embodiments, such as in an offshore drilling operation, a volume of water may separate the drilling platform 102 and the wellbore 104.

The drilling system 100 may include a derrick 108 supported by the drilling platform 102 and having a traveling block 110 for raising and lowering a drill string 112. A kelly 114 may support the drill string 112 as it is lowered through a rotary table 116. A drill bit 118 may be coupled to the drill string 112 and driven by a downhole motor and/or by rotation of the drill string 112 by the rotary table 116. As the drill bit 118 rotates, it creates the wellbore 104, which penetrates the subterranean formations 106. A pump 120 may circulate drilling fluid through a feed pipe 122 and the kelly 114, downhole through the interior of drill string 112, through orifices in the drill bit 118, back to the surface via the annulus defined around drill string 112, and into a retention pit 124. The drilling fluid cools the drill bit 118 during operation and transports cuttings from the wellbore 104 into the retention pit 124.

The drilling system 100 may further include a bottom hole assembly (BHA) coupled to the drill string 112 near the drill bit 118. The BHA may comprise various downhole measurement tools such as, but not limited to, measurement-while-drilling (MWD) and logging-while-drilling (LWD) tools, which may be configured to take downhole measurements of drilling conditions. The MWD and LWD tools may include at least one resistivity logging tool 126, which may comprise one or more coil antennas either collocated spaced or axially spaced along the length of the resistivity logging tool 126 and capable of receiving and/or transmitting electromagnetic (EM) signals. As will be described in detail below, the resistivity logging tool 126 may further comprise a soft magnetic band used to enhance and/or shield the EM signals and thereby increase the azimuthal sensitivity of the resistivity logging tool 126.

As the drill bit 118 extends the wellbore 104 through the formations 106, the resistivity logging tool 126 may continuously or intermittently collect azimuthally-sensitive measurements relating to the resistivity of the formations 106, i.e., how strongly the formations 106 opposes a flow of electric current. The resistivity logging tool 126 and other sensors of the MWD and LWD tools may be communicably coupled to a telemetry module 128 used to transfer measurements and signals from the BHA to a surface receiver (not shown) and/or to receive commands from the surface receiver. The telemetry module 128 may encompass any known means of downhole communication including, but not limited to, a mud pulse telemetry system, an acoustic telemetry system, a wired communications system, a wireless communications system, or any combination thereof. In certain embodiments, some or all of the measurements taken at the resistivity logging tool 126 may also be stored within the resistivity logging tool 126 or the telemetry module 128 for later retrieval at the surface upon retracting the drill string 112.

Figure 2:
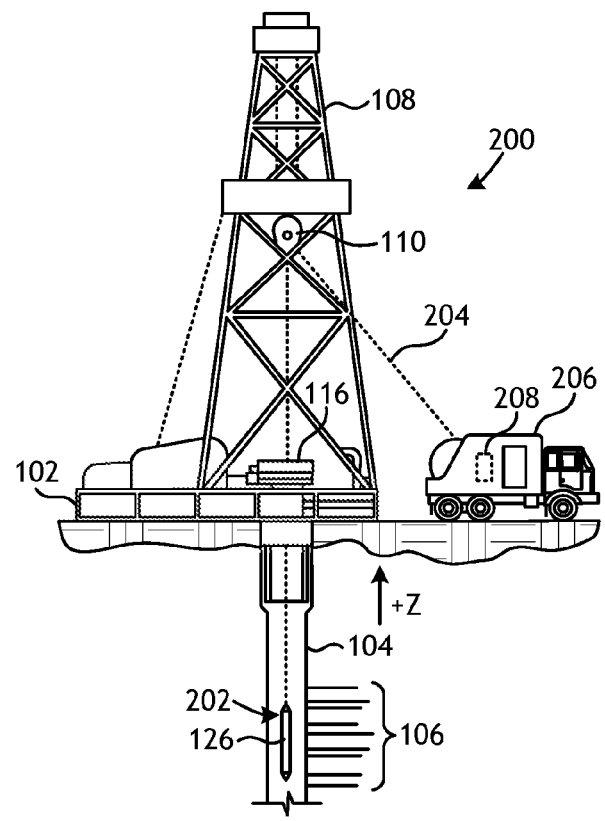
FIG. 2 is a schematic diagram of an exemplary wireline system that may employ the principles of the present disclosure.

At various times during the drilling process, the drill string 112 may be removed from the wellbore 104, as shown in FIG. 2, to conduct measurement/logging operations. More particularly, FIG. 2 depicts a schematic diagram of an exemplary wireline system 200 that may employ the principles of the present disclosure, according to one or more embodiments. Like numerals used in FIGS. 1 and 2 refer to the same components or elements and, therefore, may not be described again. As illustrated, the wireline system 200 may include a wireline instrument sonde 202 that may be suspended into the wellbore 104 by a cable 204. The wireline instrument sonde 202 may include the resistivity logging tool 126 described above, which may be communicably coupled to the cable 204. The cable 204 includes conductors for transporting power to the wireline instrument sonde 202 and also facilitates communication between the surface and the wireline instrument sonde 202. A logging facility 206, shown in FIG. 2 as a truck, may collect measurements from the resistivity logging tool 126, and may include computing and data acquisition systems 208 for controlling, processing, storing, and/or visualizing the measurements gathered by the resistivity logging tool 126. The computing facilities 208 may be communicably coupled to the resistivity logging tool 126 by way of the cable 204.

Figure 3A:
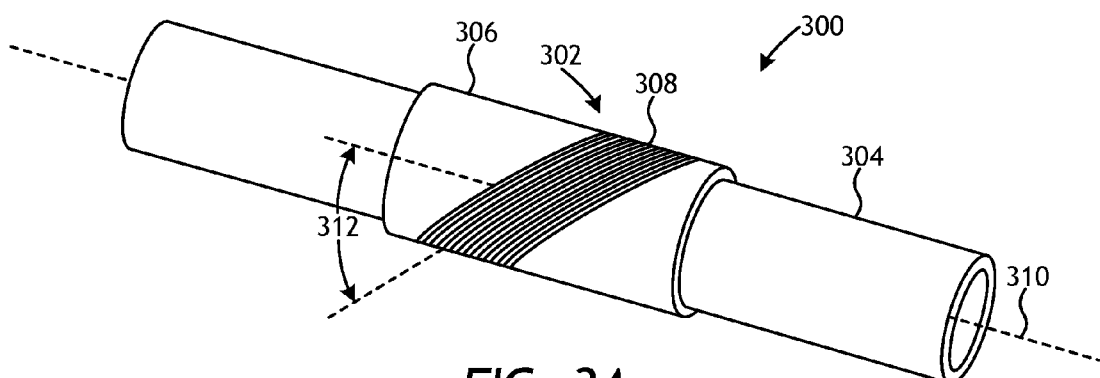
FIGS. 3A and 3B are views of an exemplary antenna assembly.

FIG. 3A is a partial isometric view of an exemplary resistivity logging tool 300. The resistivity logging tool 300 may be the same as or similar to the resistivity logging tool 126 of FIGS. 1 and 2 and, therefore, may be used in the drilling or wireline systems 100, 200 depicted therein. The resistivity logging tool 300 is depicted as including an antenna assembly 302 that can be positioned about a tool mandrel 304, such as a drill collar or the like. The antenna assembly 302 includes a bobbin 306 and a coil 308 wrapped about the bobbin 306 and extending axially by virtue of winding along at least a portion of the outer surface of the bobbin 306.

The bobbin 306 may structurally comprise a high temperature plastic, a thermoplastic, a polymer (e.g., polyimide), a ceramic, or an epoxy material, but could alternatively be made of a variety of other non-magnetic, electrically insulating/non-conductive materials. The bobbin 306 can be fabricated, for example, by additive manufacturing (i.e., 3D printing), molding, injection molding, machining, or other known manufacturing processes.

The coil 308 can include any number of consecutive "turns" (i.e. windings of wire) about the bobbin 306, but will typically include at least two or more consecutive full turns, with each full turn extending 360° about the bobbin 306. In some embodiments, a pathway or guide for receiving the coil 308 may be formed along the outer surface of the bobbin 306. For example, one or more channels may be defined in the outer surface of the bobbin 306 to receive and seat the multiple windings of the coil 308. In other embodiments, however, the bobbin 306 may be omitted altogether from the resistivity logging tool 300, without departing from the scope of the disclosure.

The coil 308 can be concentric or eccentric relative to a tool axis 310 of the tool mandrel 304. As illustrated, the turns or windings of the coil 308 extend about the bobbin 306 at a winding angle 312 that is angularly offset from the tool axis 310. As a result, the antenna assembly 302 may be characterized and otherwise referred to as a "tilted coil antenna" or "directional antenna." In the illustrated embodiment, and by way of example, the winding angle 312 is angularly offset from the tool axis 310 by 45°, but could alternatively be any angle offset from the tool axis 310, without departing from the scope of the disclosure.

Figure 3B:
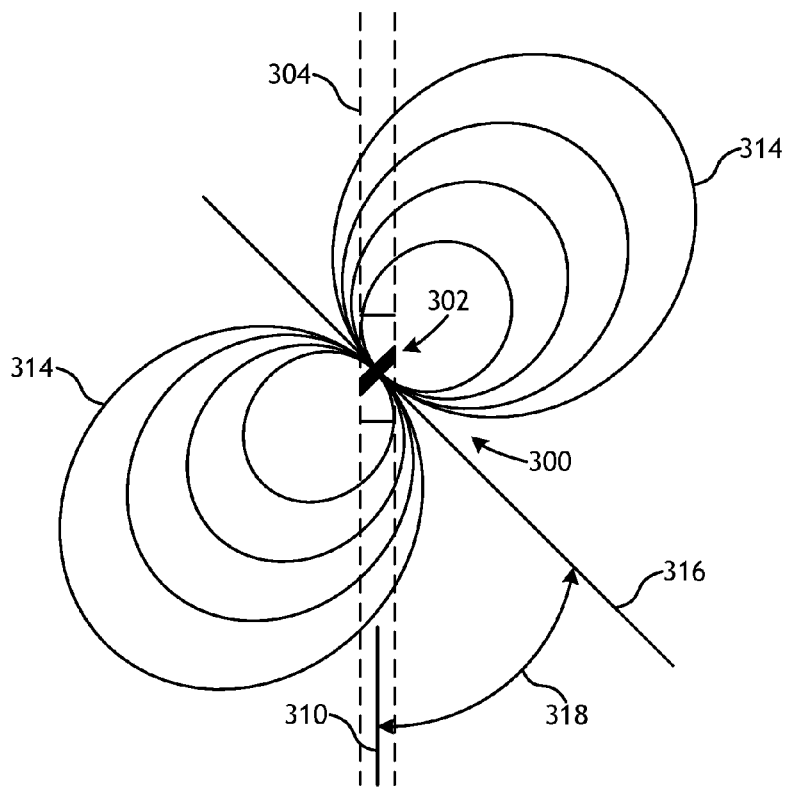

FIG. 3B is a schematic side view of the resistivity logging tool 300 of FIG. 3A. When current is passed through the coil 308 (FIG. 3A) of the antenna assembly 302, a dipole magnetic field 314 may be generated that extends radially outward from the antenna assembly 302 with a dipole magnetic moment 316 that extends generally orthogonal to the winding direction of the coil 308 at a magnetic field angle 318. Accordingly, since the winding angle 312 (FIG. 3A) is 45°, the resulting magnetic field angle 318 will also be 45° offset from the tool axis 310, but opposite the winding angle 312. As will be appreciated, however, the magnetic field angle 318 (i.e., the directionality of the dipole magnetic moment 316) may be varied by adjusting or manipulating the winding angle 312.

FIG. 4 is a side view of another exemplary resistivity logging tool 400. Similar to the resistivity logging tool 300 of FIGS. 3A-3B, the resistivity logging tool 400 may be the same as or similar to the resistivity logging tool 126 of FIGS.

1 and 2 and, therefore, may be used in the drilling or wireline systems 100, 200 depicted therein. Similar numerals from FIGS. 3A-3B that are used in FIG. 4 refer to similar components or elements that may not be described again. The resistivity logging tool 400 comprises an antenna assembly 402 that includes a multi-turn coaxial coil 404 and a plurality of multi-turn tilted coils 406, shown as a first tilted coil 406a, a second tilted coil 406b, and a third tilted coil 406c. The coaxial coil 404 and the tilted coils 406a-c may each be positioned about a tool mandrel 408, such as a drill collar or the like, and may also each wrap about individual bobbins 410 similar to the bobbin 306 of FIGS. 3A-3B.

Each tilted coil 406a-c may be azimuthally (circumferentially) offset from each other by 120° about the outer periphery of the tool mandrel 408 and, similar to the coil 308 of FIGS. 3A-3B, each may extend about the respective bobbins 410 at the winding angle 312 angularly offset from the tool axis 310. Accordingly, each tilted coil 406a-c may be oriented to generate corresponding magnetic dipole moments 316 (one shown) that are orthogonal to the winding angle 312. In the event the winding angle is 45°, each magnetic dipole moment 316 may exhibit a magnetic field angle 318 that is 45° offset from the tool axis 310, but opposite the winding angle 312. Each of the coaxial coil 404 and the tilted coils 406a-c may be interchangeable and otherwise used as a transmitter, a receiver, or a transceiver.

The coaxial coil 404 and the tilted coils 406a-c may be axially spaced from each other along the tool mandrel 408 at nominal spacings of, for example, 25 feet, 50 feet, 100 feet, or any other desired spacing. Accordingly, depending on the design and application, the overall length of the resistivity logging tool 400 can be quite long. To save on costs related to materials, weight, and space, it may be advantageous to shorten the length of the resistivity logging tool 400. In some embodiments, this may be accomplished by collocating the coaxial coil 404 and the tilted coils 406a-c, that is, locating the coaxial coil 404 and the tilted coils 406a-c at the same axial position along the tool mandrel 408, where the tilted coils 406a-c remain azimuthally offset from each other by 120°. In such embodiments, the antenna assembly 402 would be located at a single point or location along the axial length of the tool mandrel 408.

To increase the depth of investigation of the antenna assembly 402, according to embodiments of the present disclosure, a soft magnetic band (not expressly shown) can be positioned between the collocated coils 404, 406a-c and the tool mandrel 408 and thereby help increase the inductance of collocated coils 404, 406a-c while preserving the directionality (i.e., the angle 318 of the magnetic dipole moment 316) of each coil 404, 406a-c. Moreover, in some embodiments, and due to harsh drilling or downhole conditions, a protective shield (not expressly shown) may also be secured over the tool mandrel 408 to protect the coils 404, 406a-c while simultaneously preserving the directionality as well.

Referring to FIGS. 5A and 5B, illustrated are side views of exemplary collocated antenna assemblies 500a and 500b, respectively, according to one or more embodiments. As illustrated, each antenna assembly 500a,b includes at least two collocated coils 502 wrapped about a tool mandrel 504 and, more particularly, within a saddle 506 defined on the tool mandrel 504. The saddle 506 may comprise a portion of the tool mandrel 504 that exhibits a reduced-diameter as compared to the remaining portions of the tool mandrel 504. Some or all of the components of each antenna assembly 500a,b may be arranged within the saddle 506. While not shown, the bobbin 306 (FIG. 3A) may optionally be included to interpose the coils 502 and the tool mandrel 504 (i.e., the saddle 506), as generally discussed above.

In FIG. 5A a first tilted coil 502a and a tilted second coil 502b are depicted as being collocated about the tool mandrel 504 and azimuthally offset from each other by 180°. In FIG. 5B, the first and second tilted coils 502a,b are depicted as being collocated about the tool mandrel 504 with a third tilted coil 502c, where each tilted coil 502a-c is azimuthally offset from each other by 120°.

Each antenna assembly 500a,b may include a soft magnetic band 508 that interposes the collocated tilted coils 502 and the tool mandrel 504. The soft magnetic band 508 may be used to shield the tilted coils 502 from eddy currents generated by the tool mandrel 504, and thereby increase the azimuthal sensitivity of the antenna assemblies 500a,b and/or increase the efficiency or strength of the dipole magnetic field 316 (FIGS. 3B and 4) of each tilted coil 502.

To help facilitate this effect, the soft magnetic band 508 may comprise a soft magnetic material or any material that exhibits relatively high resistivity, high magnetic permeability, and low magnetic loss (e.g., hysteresis, magnetostriction, etc.). One suitable soft magnetic material that may be used includes ferrites, which generally comprise a composite mixture of a powder iron/ferrite material and a binder, such as a silicone-based rubber, an elastomer, an RTV, a polymer (e.g., polyimide), a ceramic, or an epoxy. The resulting mixture is molded, pressed, or machined into desired geometric shapes and configurations that conform to the shape of the soft magnetic band 508. Other suitable soft magnetic materials that may be used in the soft magnetic band 508 include, but are not limited to, mu-metal, permalloy, metallic glass (metglass), or any combination of the foregoing.

To help maintain the directionality of the magnetic dipole moment 316 at, for example, 45° relative to the tool axis 310, the soft magnetic band 508 may comprise a plurality of strips or inserts 510 that form one or more discontinuous annular rings extending about the circumference of the tool mandrel 504. At least some of the inserts 510 exhibit a tilted cutting shape and, therefore, may be referred to as "tilted" inserts 510. Each "tilted" insert 510 may be separated by a small gap that prevents physical contact between laterally adjacent inserts 510, and thereby prevents a continuous magnetic path between the adjacent inserts 510. In some embodiments, the gap may be filled with a material that exhibits a relative permeability ($\mu_r$) of approximately 1, which is equivalent to the permeability of free space or air ($\mu_o$). In other embodiments, the gap may not be filled with any particular material, but air may instead separate the adjacent inserts 510. In any case, the gap essentially serves as a non-magnetic insulator between the adjacent inserts 510.

In antenna assemblies including only one of the tilted coils 502, the soft magnetic band 508 may be custom-designed generally in the trace (mounting direction) of the single tilted coil 502 (or vertical to the trace of the coil 502) to maintain the original directionality (e.g., 45°) of the tilted coil 502. However, in the illustrated antenna assemblies 500a,b that incorporate a plurality of collocated tilted coils 502a-c, a custom-designed soft magnetic band 508 used for one tilted coil 502 may jeopardize the directionality for the remaining collocated tilted coils 502 since the remaining tilted coils 502 are oriented in different azimuthal directions. The design of the soft magnetic band 508, therefore, should encourage the inductance of the collocated coils 502a-c without changing the effective magnetic field angle 318 (FIG. 3B) of the corresponding magnetic dipole moments 316 (FIGS. 3B and 4).

In FIG. 5A, the design of the soft magnetic band 508 is configured to encompass a 180° azimuthally equivalent magnetic layer used to protect the 180° azimuthally offset first and second tilted coils 502a,b. In FIG. 5B, the design of the soft magnetic band 508 is configured to encompass a 120° azimuthally equivalent magnetic layer used to protect the 120° azimuthally offset first, second, and third tilted coils 502a-c.

The designs of the soft magnetic band 508 in FIGS. 5A and 5B may prove advantageous in exhibiting good gain while preserving the original magnetic field angle 318 (FIG. 3B) of the corresponding magnetic dipole moments 316 (FIGS. 3B and 4). These designs, however, may be limited in several aspects. For instance, the designs are specialized for certain azimuth angles, and are thus not azimuth-free. More particularly, the soft magnetic band 508 of FIG. 5A cannot be used for the 120° azimuthally equivalent collocated coils 502a-c of FIG. 5B, and the soft magnetic band 508 of FIG. 5B cannot be used for the 180° azimuthally equivalent collocated coils 502a,b of FIG. 5A. Moreover, the designs of FIGS. 5A-5B are limited in that neither design can be effectively used to collocate a coaxial coil (e.g., the coaxial coil 404 of FIG. 4) with the tilted coils 502a-c since the inserts 510 are not azimuthally symmetric, and would therefore adversely affect the magnetic dipole moment directionality of the coaxial coil. Lastly, the designs of the soft magnetic band 508 in FIGS. 5A and 5B are further limited in that at least some of the tilted inserts 510 are required to exhibit a complex geometry having a unique cross-section that must be twisted and arched to conform to the curvature of the tool mandrel 504 and/or the saddle 506. As a result, it can be quite difficult and expensive to accurately manufacture such inserts 510.

According to embodiments of the present disclosure, a symmetrically-designed soft magnetic band may be incorporated in an antenna assembly having a plurality of collocated coils. The unique design of the symmetric soft magnetic band may be configured to simultaneously preserve the directionality for azimuthal, arbitrarily-oriented tilted coils and coaxial coils. In addition to the symmetric soft magnetic band, such antenna assemblies may further include a protective shield also designed to be symmetric and thereby help preserve the directionalities of each coil. As a result, the antenna assembly may be shorter than conventional antenna assemblies and, therefore, more space efficient, but also preserves the dipole orientation of collocated tilted and coaxial coils.

Referring to FIGS. 6A-6C, illustrated are side views of exemplary collocated antenna assemblies 600a, 600b, and 600c, respectively, that employ the principles of the present disclosure according to one or more embodiments. The antenna assemblies 600a-c may be similar in some respects to the antenna assemblies 500a,b of FIGS. 5A and 5B and therefore may be best understood with reference thereto, where like numerals represent like components or elements that may not be described. As illustrated, each antenna assembly 600a-c includes at least one coil 502 wrapped about the tool mandrel 504 and, more particularly, within the saddle 506 defined on the tool mandrel 504. For simplicity, only one coil 502 is shown in FIGS. 6A-6C, but it will be appreciated that each antenna assembly 600a-c may include multiple collocated coils 502, such as including a plurality of collocated tilted coils or alternatively including one or more collocated tilted coils and a coaxial coil. Moreover, for simplicity, only one winding of the coil 502 is shown in FIGS. 6A-6C, but it will be appreciated that the coil 502 may include a plurality of windings that extend axially along a portion of the tool mandrel 504. Furthermore, while not shown, the bobbin 306 (FIG. 3A) may be included in some embodiments to interpose the collocated coils 502 and the tool mandrel 504 (i.e., the saddle 506), as generally discussed above.

As illustrated, the winding of the coil 502 extends about the circumference of the tool mandrel 504 at the winding angle 312, which may be offset from the tool axis 310, for example, by 45°. As a result, the magnetic dipole moment 316 generated by the coil 502 may extend from the tool mandrel 504 at the magnetic field angle 318, which is generally orthogonal to the winding angle 312 of the coil 502. The directionality of the magnetic dipole moment 316 may generally correspond to the direction in which the coil 502 emits the dipole magnetic field 314 (FIG. 3B) when current is passed therethrough. In some applications, it may be desired to have the magnetic dipole moment 316 of the tilted coil offset from the tool axis 310 by 45°, but the magnetic field angle 318 could alternatively be any angle between parallel and perpendicular to the tool axis 310 because of effects caused by the tool mandrel 504 or as a result of using a soft magnetic band, as described below.

To overcome the above-described limitations of the embodiments of FIGS. 5A-5B, various designs and/or embodiments of a soft magnetic band 602 may interpose the coil 502 and the tool mandrel 504. The soft magnetic band 602 may be similar in some respects to the soft magnetic band 508 of FIGS. 5A-5B, such as being made of similar soft magnetic materials. Unlike the soft magnetic band 508 of FIGS. 5A-5B, however, the soft magnetic band 602 in each of FIGS. 6A-6C may comprise a plurality of inserts 604 that form a symmetric, cylindrical, and two-dimensional array extending about the tool mandrel 504.

In some embodiments, as illustrated in FIGS. 6A and 6B, at least some of the inserts 604 may comprise curved or arcuate squares or rectangles. The arcuate inserts 604 may be configured to conform to the curvature of the tool mandrel 504 and/or the saddle 506. In other embodiments, however, as illustrated in FIG. 6C, at least some of the inserts 604 may comprise cylindrical or short tubular members. The cylindrical inserts 604 may be positioned symmetrically about the curvature of the tool mandrel 504 and/or the saddle 506. As will be appreciated, the arcuate or cylindrical design of the inserts 604 is a simpler and cheaper way to manufacture the soft magnetic band 602, as compared to the inserts 510 of FIGS. 5A-5B.]

The inserts 604 may be arranged about the tool mandrel 504 to form one or more annular arrays 606 that extend about the tool mandrel 504 at an angle orthogonal to the tool axis 310. In FIG. 6A, for example, the soft magnetic band 602 includes nine annular arrays 606 axially spaced from each other along the tool axis 310 by an axial gap 608. The soft magnetic band 602 of FIG. 6B includes three annular arrays 606 axially spaced from each other along the tool axis 310 by the axial gap 608, and the soft magnetic band 602 of FIG. 6C includes five annular arrays 606 axially spaced from each other along the tool axis 310 by an axial gap 608. In at least one embodiment, as shown in FIG. 6C, at least a portion of the coil 502 extends axially past the annular arrays 606 where the soft magnetic band 602 fails to radially interpose the coil 502 and the tool mandrel 504. The axial gap 608 defined between axially adjacent annular arrays 606 may extend substantially perpendicular to the tool axis 310.

Moreover, each annular array 606 includes a plurality of inserts 604 that are circumferentially spaced from each other by an angular gap 610, where the angular gap 610 between angularly adjacent inserts 604 extends substantially parallel to the tool axis 310. The axial and angular gaps 608, 610 prevent physical contact between axially and angularly adjacent inserts 604, and thereby prevent a continuous magnetic path between the adjacent inserts 604. In some embodiments, the gaps 608, 610 may be filled with a material that exhibits a relative permeability ($\mu_r$) of approximately 1, which is equivalent to the permeability of free space or air ($\mu_o$). In other embodiments, the gaps 608, 610 may not be filled with any particular material, but air may instead separate the axially and angularly adjacent inserts 604. In any case, the gaps 608, 610 essentially serve as a non-magnetic insulator between adjacent inserts 604.

Accordingly, the soft magnetic band 602 is symmetrically-spaced and otherwise positioned about the tool mandrel 504 in both the axial and azimuthal directions, where the annular arrays 606 are cylindrically symmetric. As a result, the soft magnetic band 602 may be characterized as being azimuthally free or azimuthally invariant and, therefore, azimuthally equivalent to the coil 502. In other words, if the soft magnetic band 602 is able to preserve the directionality for the 45° tilted coil 502 at a certain azimuthal angle, it will likewise be capable of preserving the directionality for a tilted coil 502 at any offset azimuthal angle. Consequently, no matter what the winding angle 312 of the coil 502 is, the annular arrays 606 of the inserts 604 will not adversely affect the directionality of the coil 502. To preserve the directionality, the number of inserts 604 and the size of the gaps 608, 610 between the inserts 604 may be adjusted. However, as long as the inserts 604 are symmetrically arrayed about the tool mandrel 504, any collocated tilted coils with azimuth offset are azimuthally equivalent. More particularly, since the soft magnetic band 602 is azimuth free, it could be used to collocate multiple tilted coils 502 and optionally a coaxial coil (e.g., coaxial coil 404 of FIG. 4), without adversely affecting the measurement capability of the antenna assemblies 600a-c. As long as the directionality for one tilted coil 502 is preserved, the directionality for the remaining azimuthally-offset tilted coils 502 will also be preserved. Moreover, since the magnetic band is cylindrically symmetric, it can likewise preserve the directionality of a coaxial coil.

To facilitate a better understanding of the present disclosure, the following examples and simulations of the antenna assemblies 600a-c are provided. In no way should these examples be read to limit, or to define, the scope of the disclosure. The antenna assemblies 600a-c may be capable of working in sequential transmitting and receiving modes (i.e., only one coil 502 is working at a time) and, as a result, the cross talk between any collocated coils 502 is not discussed in this disclosure. Consequently, only one coil 502 is modeled in the following examples to represent the performance of other azimuthally equivalent coils 502.

In the examples that follow, the tool mandrel 504 is assumed to be a non-magnetic steel alloy (e.g., INCONEL®) with a conductivity of $7 \times 10^6$ S/m. Moreover, the relative magnetic permeability ($\mu_m$) of the material that forms the soft magnetic band 602 is assumed to be 100 and its conductivity is 0.008 S/m. In the following examples, simulated responses for the antenna assemblies 600a-c are calculated at a first frequency F1, a second frequency F2, a third frequency F3, a fourth frequency F4, and a fifth frequency F5, where F1 <F2<F3<F4<F5.

As used herein, the directionality of a tilted coil can be defined as the minimum sensitivity of the near electric field at a fixed radius to the center of the coil. Moreover, the effective gain ($G_{eff}$) of a tilted coil can be defined as follows:

$$G_{eff} = \frac{B_{obj}}{B_{ref} N_{obj}} \quad \text{Equation (1)}$$

where $B_{ref}$ is the magnetic field of the reference model (i.e., the coil 502 without the soft magnetic band 602 and without a protective shield, as discussed below); $B_{obj}$ is the magnetic field of the objective model (i.e., the coil 502 with the soft magnetic band 602 and/or the protective shield); and $N_{obj}$ is the ratio of the winding turns of the objective model over the reference model (e.g., if both the objective model and the reference model have only one winding turn of the coil 502, then $N_{obj}=1$).

Figure 7A:
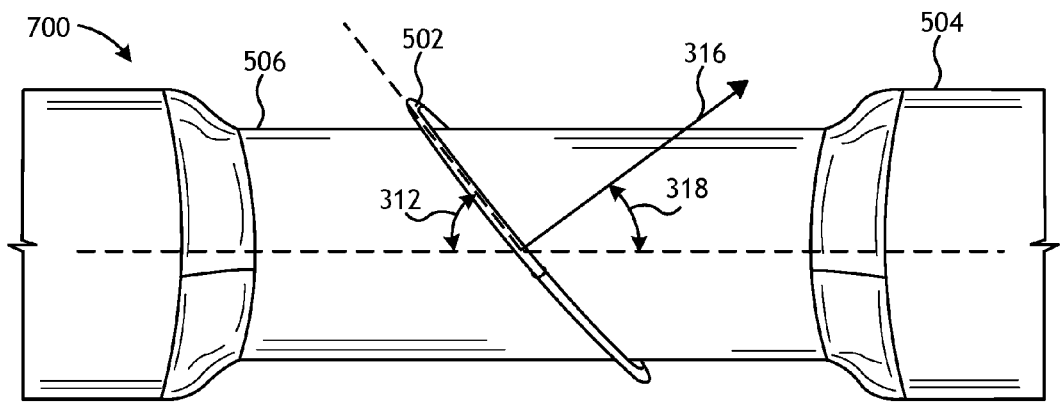
FIG. 7A depicts an antenna assembly that will be used as a reference model for examples described herein.

FIG. 7A depicts a reference antenna assembly 700 that will be used as a reference model for the following examples. The reference antenna assembly 700 is an exemplary directional logging-while-drilling (LWD) coil antenna and will serve as a reference to which the following simulations for the antenna assemblies 600a-c of FIGS. 6A-6C are benchmarked. As illustrated, the reference antenna assembly 700 includes the tool mandrel 504, and the coil 502 extends about the circumference of the tool mandrel 504 at the winding angle 312. As a result, the magnetic dipole moment 316 generated by the coil 502 extends from the tool mandrel 504 at the magnetic field angle 318, which is generally orthogonal to the winding angle 312. Unlike the antenna assemblies 600a-c of FIGS. 6A-6C, however, the soft magnetic band 602 is omitted from the reference antenna assembly 700.

Figure 7B:
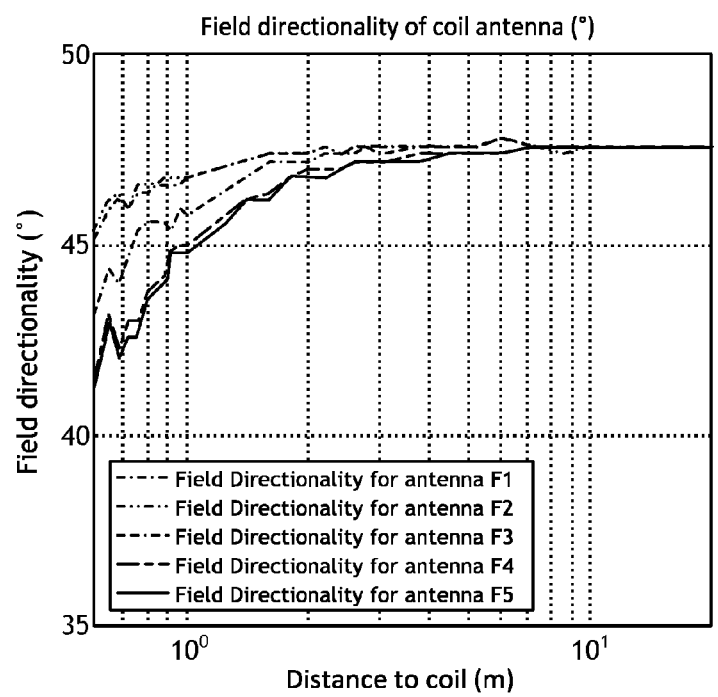
FIG. 7B is a plot showing a simulated response of the directionality of the magnetic dipole moment of the coil from the antenna assembly of FIG. 7A upon being excited.
Figure 7C:
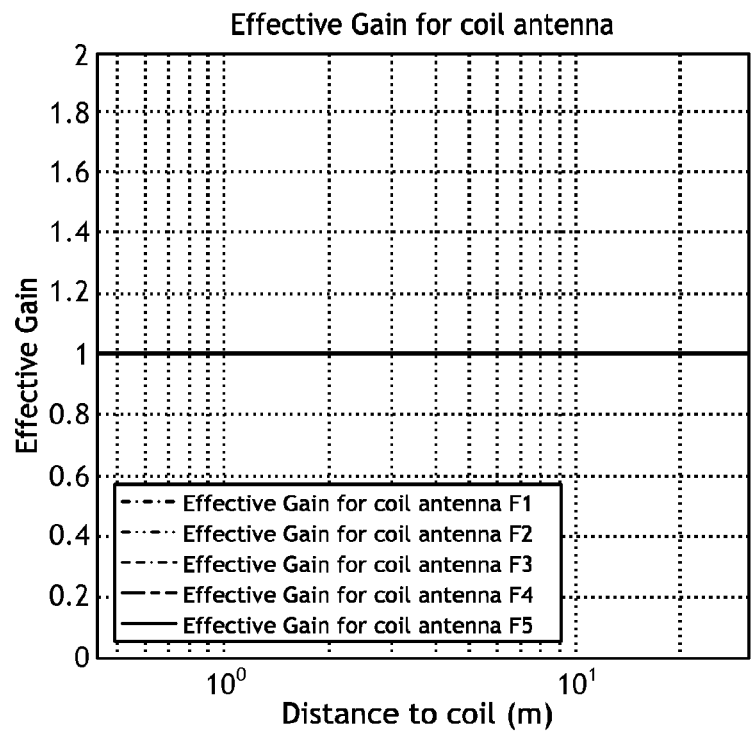
FIG. 7C is a plot showing a simulated response of the near-field gain of the coil from the antenna assembly of FIG. 7A upon being excited.
Figure 8A:
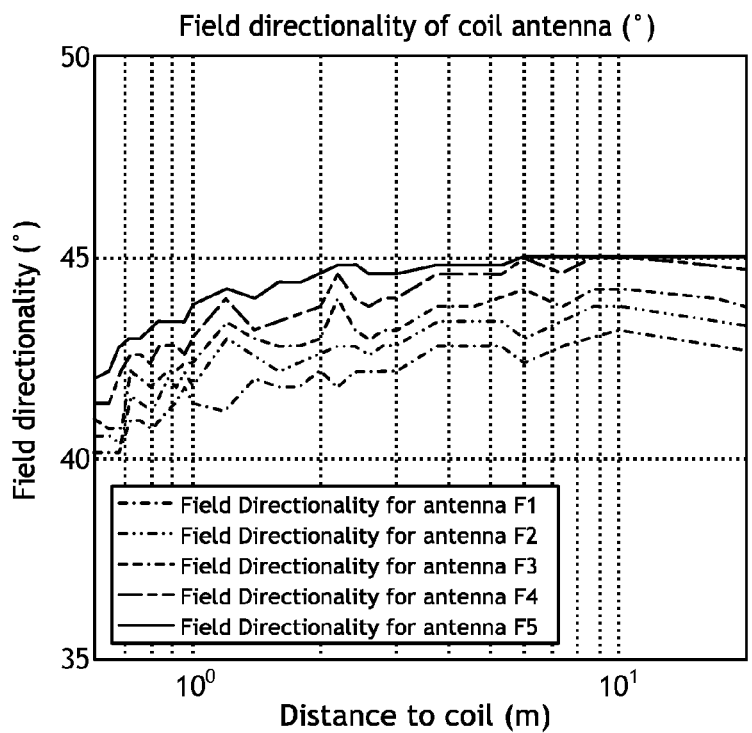
FIGS. 8A-8C are plots showing a simulated response of the directionality of the magnetic dipole moment of the coil from the antenna assemblies of FIGS. 6A-6C, respectively, upon being excited.
Figure 8B:
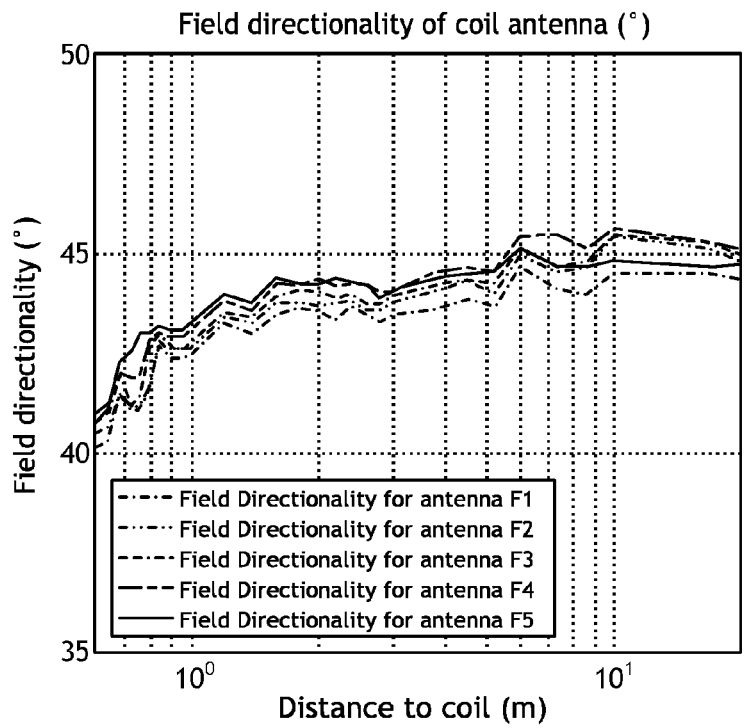
Figure 8C:
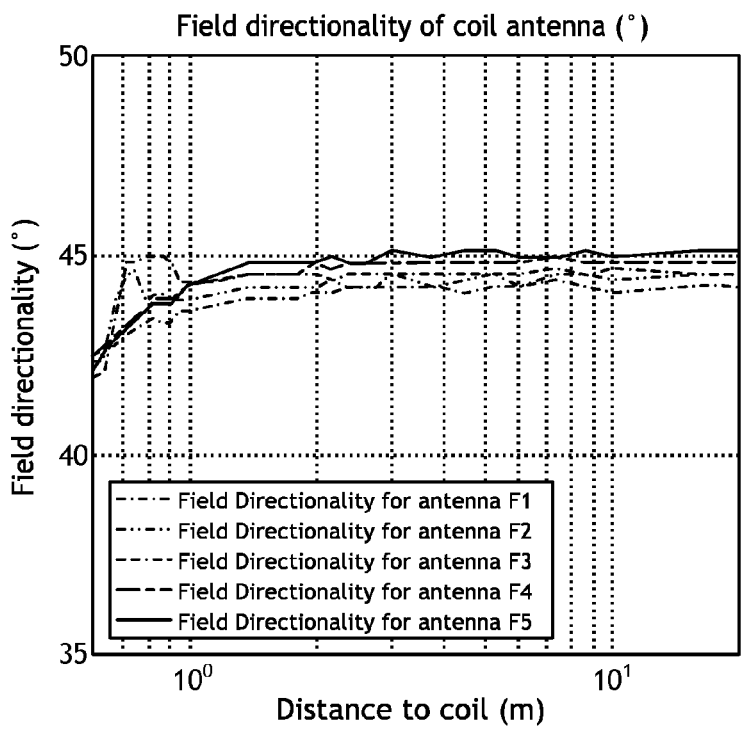
Figure 9A:
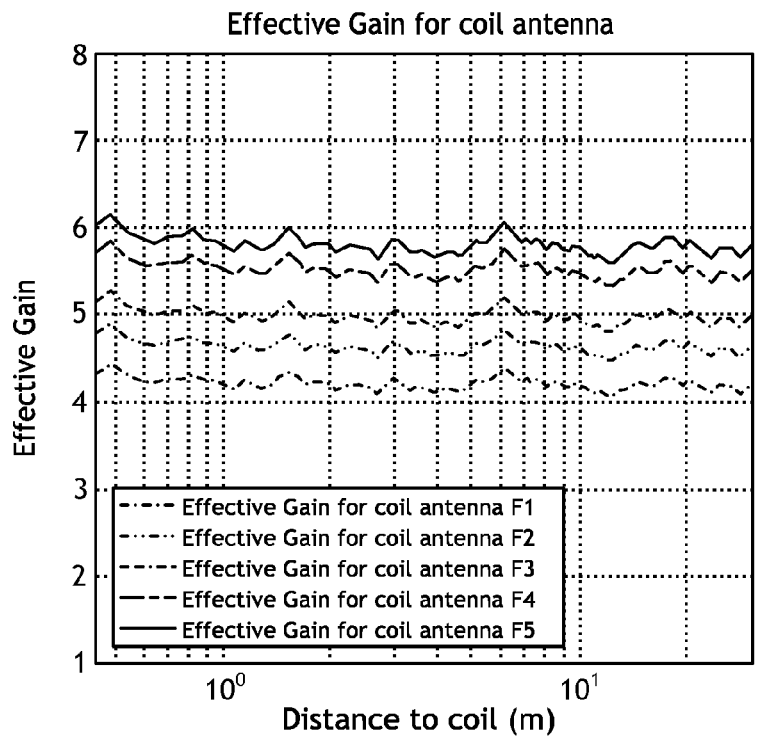
Figure 9B:
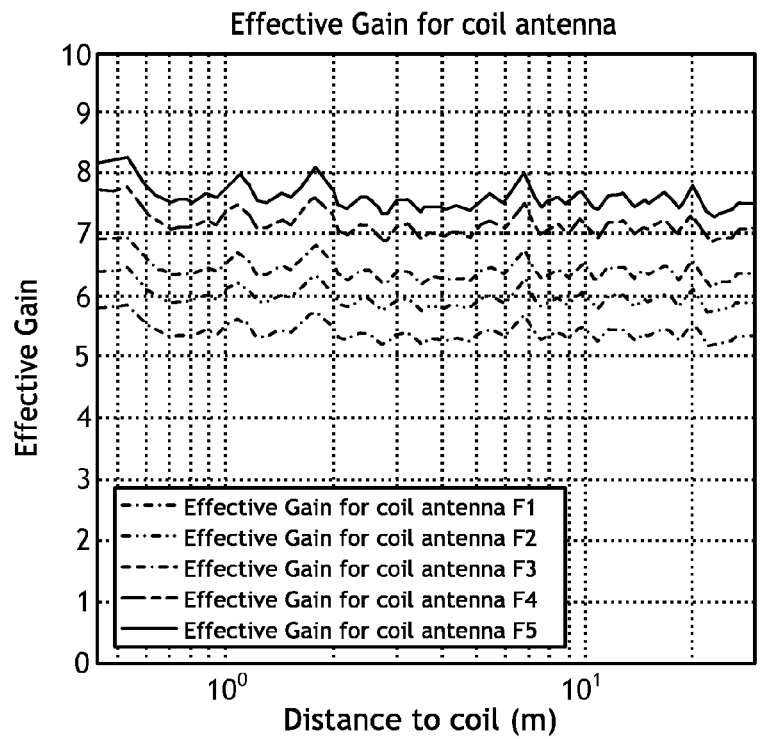
Figure 9C:
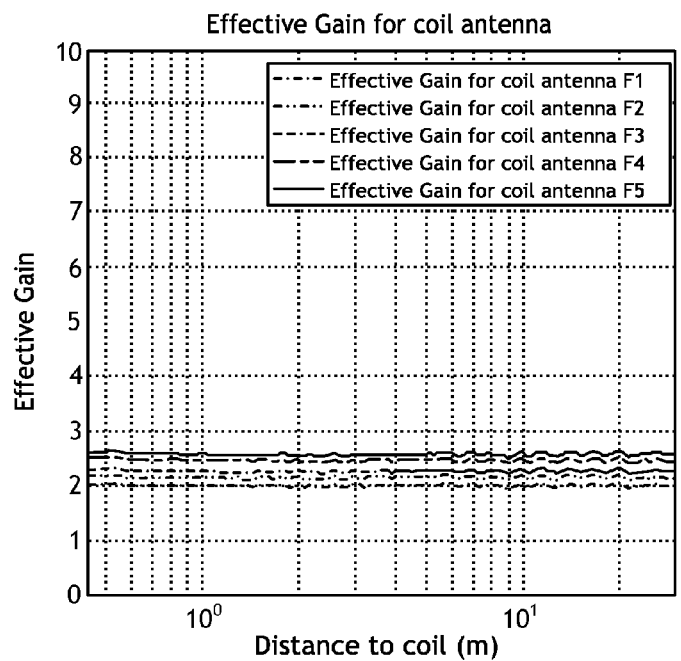

FIGS. 7B and 7C are plots showing simulated responses of the directionality of the magnetic dipole moment of the coil 502 and the near-field gain of the coil 502, respectively, from the reference antenna assembly 700 upon being excited. The plots of FIGS. 7B and 7C are used as a reference to which the following simulations for the antenna assemblies 600a-c are benchmarked. In contrast to FIG. 7B, FIGS. 8A-8C are plots showing a simulated response of the directionality of the magnetic dipole moment of the coil 502 from each antenna assembly 600a-c of FIGS. 6A-6C, respectively, upon being excited. In contrast to FIG. 7C, FIGS. 9A-9C are plots showing a simulated response of the near-field gain of the coil 502 from each antenna assembly 600a-c of FIGS. 6A-6C, respectively, upon being excited.

As discussed above, the antenna assemblies 600a-c each include the symmetric soft magnetic band 602. In view of FIGS. 7B and 7C, the modeling results shown in FIGS. 8A-8C and 9A-9C show that the presently-described embodiments of the symmetric soft magnetic band 602 may prove advantageous in preserving the dipole directionality (within ±5°), and the effective gain brought by presently-described embodiments makes it advantageous over the traditional reference antenna assembly 700 of FIG. 7A. Accordingly, in contrast to the simulated responses derived from the reference antenna assembly 700, FIGS. 8A-8C and 9A-9C show that the azimuthally invariant soft magnetic band 602 constitutes an improvement over traditional directional LWD antennas of a single turn tilted coil 502 wound about the tool mandrel 504.

FIGS. 10A and 10B are side views of additional exemplary embodiments of the antenna assembly 600a of FIG. 6A. Unlike the embodiment of FIG. 6A, the embodiments shown in FIGS. 10A and 10B include a protective shield 1002 coupled to the tool mandrel 504 and generally extending axially across the saddle 506. The protective shield 1002 may encompass the coil 502 and the soft magnetic band 602 and thereby protect the coil 502 from mechanical damage during downhole operation. It will be appreciated that the soft magnetic band 602 may be replaced with either of the soft magnetic bands 602 of FIG. 6B or 6C, without departing from the scope of the disclosure.

The protective shield 1002 may be made of a non-magnetic metal such as, but not limited to, steel, stainless steel, INCONEL® (nickel alloy), and any combination thereof. In other embodiments, the protective shield 1002 may be made of a plastic or a composite material, or a combination of the foregoing with a metal.

The protective shield 1002 may include a plurality of holes 1004 that permit the transfer of electromagnetic (EM) signals to and from the coil 502. Accordingly, the protective shield 1002 may be characterized as a transmissive shield. Similar to the soft magnetic band 602, in some embodiments, the series of holes 1004 may be symmetric in two dimensions. More particularly, the holes 1004 may be aligned and otherwise defined in one or more annular hole arrays 1006 that extend about the tool mandrel 504 at an angle orthogonal to the tool axis 310. In FIG. 10A, for example, the protective shield 1002 includes three annular hole arrays 1006 axially spaced from each other along the tool axis 310 by an axial gap 1008, and the protective shield 1002 of FIG. 10B includes six annular hole arrays 1006 axially spaced from each other along the tool axis 310 by the axial gap 1008. The axial gap 1008 defined between axially adjacent annular hole arrays 1006 may extend substantially perpendicular to the tool axis 310 and its magnitude may vary, depending on the design and number of holes 1004.

Moreover, the holes 1004 in each annular hole array 1006 may be circumferentially spaced from each other by an angular gap 1010, where the angular gap 1010 between angularly adjacent holes 1004 extends substantially parallel to the tool axis 310. Accordingly, the holes 1004 defined in the protective shield 1002 may be designed to be symmetrically-spaced about the tool mandrel 504 in both the axial and azimuthal directions. In operation, the protective shield 1002 may work together with the soft magnetic band 602 to maintain the directionality of the coil 502 and any collocated coils (not shown).

In some embodiments, an electromagnetically transmissive material (not shown), such as a polymer (e.g., PEEK), a polymer-ceramic blend, or a ceramic, may be disposed between the protective shield 1002 and the saddle 506, thereby encapsulating the coil 502 and the soft magnetic band 602. In such embodiments, the electromagnetically transmissive material may be exposed via the holes 1004 and may prove advantageous in providing high mechanical strength to the antenna assembly 600a while being electrically transmissive. Accordingly, such materials may be configured to protect the antenna assembly 600a while not significantly attenuating the EM fields transmitted from or received by the coil 502.

FIGS. 11A and 11B are plots showing a simulated response of the directionality of the magnetic dipole moment of the coil 502 from the antenna assemblies 600a of FIGS. 10A and 10B, respectively, upon being excited. The plots in FIGS. 11A and 11B are to be analyzed in view of the plot of FIG. 7B, which shows the simulated response of the directionality of the magnetic dipole moment of the coil 502 from the reference antenna assembly 700 of FIG. 7A upon being excited. FIGS. 12A and 12B are plots showing a simulated response of the near-field gain of the coil 502 from each antenna assembly 600a of FIGS. 10A and 10B, respectively, upon being excited. The plots in FIGS. 12A and 12B are to be analyzed in view of the plot of FIG. 7C, which shows the simulated response of the near-field gain of the coil 502 from the reference antenna assembly 700 of FIG. 7A upon being excited.

As discussed above, the antenna assemblies 600a of FIGS. 10A and 10B each include the symmetric soft magnetic band 602 and the protective shield 1002 to cooperatively maintain the directionality of the coil 502. The modeling results shown in FIGS. 11A-11B show that the presently-described embodiments of the symmetric soft magnetic band 602 with the protective shield 1002 may prove advantageous in preserving the dipole directionality (within ±5°). Moreover, the modeling results shown in FIGS. 12A-12B show that the effective gain brought by presently-described embodiments makes it advantageous over the reference antenna assembly 700 of FIG. 7A without the soft magnetic band 602 and the protective shield 1002.

FIG. 13 depicts another reference antenna assembly 1300 that will be used as a reference model for a subsequently-described example. The antenna assembly 1300 is an exemplary directional logging-while-drilling (LWD) coil antenna and will serve as a reference to which the following simulation is benchmarked. As illustrated, the antenna assembly 1300 includes the tool mandrel 504, and the coil 502 extends about the circumference of the tool mandrel 504 and is coaxial with the tool axis 310. Similar to the reference model antenna assembly 700 of FIG. 7A, the soft magnetic band 602 is omitted from the antenna assembly 1300. Because the reference antenna assembly 1300 includes only a single coaxial coil 502, the directionality for antenna assembly 1300 is 0° and the gain is 1 as reference.

FIG. 14A is a side view of another exemplary antenna assembly 1400 that employs the principles of the present disclosure according to one or more embodiments. The antenna assembly 1400 may be similar in some respects to the antenna assembly 600a of FIG. 6A, where like numerals represent like elements or components not described again. The design of the antenna assembly 1400 is contrasted below against the reference antenna assembly 1300 of FIG. 13. As illustrated, the antenna assembly 1400 includes at least one coil 502 wrapped about the tool mandrel 504 and, more particularly, within the saddle 506 defined on the tool mandrel 504. Moreover, the coil 502 extends about the circumference of the tool mandrel 504 and is coaxial with the tool axis 310.

The soft magnetic band 602 may interpose the coil 502 and the tool mandrel 504 to help preserve the directionality of the coil 502. While the soft magnetic band 602 is shown in FIG. 14A as described above with reference to FIG. 6A, it will be appreciated that the soft magnetic band 602 may be replaced with either of the soft magnetic bands 602 of FIG. 6B or 6C, without departing from the scope of the disclosure.

FIG. 14B is a plot showing a simulated response of the directionality of the magnetic dipole moment of the coil 502 from the antenna assembly 1400 of FIG. 14A upon being excited, and it shows that the directionality of the coaxial coil 502 is well preserved. FIG. 14C is a plot showing a simulated response of the near-field gain of the coil 502 from the antenna assembly 1400 of FIG. 14A upon being excited, and it shows that the design in FIG. 14A is advantageous over the reference design in FIG. 13 in terms of gain.

Referring again to FIGS. 6A-6C, and according to the present disclosure, the soft magnetic band 602 of any of the antenna assemblies 600*a-c* described herein may be tuned and otherwise optimized to alter the effective magnetic field angle 318 and, therefore, the directionality of the magnetic dipole moments 316. It may be desired, for instance, to tune the antenna assemblies 600*a-c* such that an effective magnetic field angle 318 is at or near 45° offset from the tool axis 310. In some embodiments, this may be accomplished by altering the number and/or size of the inserts 604. In other embodiments, the size of one or both of the axial gap 608 and the angular gap 610 separating laterally and circumferentially adjacent inserts 604 may be varied to tune the effective magnetic field angle 318 and, therefore, the directionality of the magnetic dipole moment 316. Similar to varying the number or size of the inserts 604, varying one or both of the axial gap 608 and the angular gap 610 may also bring the magnetic dipole moments 316 closer to a desired 45° magnetic field angle.

In yet other embodiments, the geometry of the tool mandrel 504 may be altered adjacent the coil 502. In such embodiments, for example, the shoulders of the saddle 506 (i.e., axial ends of the saddle 506) may be enlarged. Moreover, the grooves or channels defined in a bobbin (e.g., the bobbin 306 of FIG. 3A) used to receive and seat the coil 502 may be deepened. Because of eddy currents generated by the tool mandrel 504, the winding angle 312 may be slightly larger than the winding angle 312 in embodiments without the tool mandrel 504. Modifying the tool mandrel 504 is equivalent to modifying the eddy current effect so that a desired winding angle 312 can be achieved.

Accordingly, methods are described herein for constructing the soft magnetic band of an antenna assembly to preserve dipole directionality and improve one or more of gain, inductance, and sensitivity of the antenna assembly. The embodiments described herein provide several advantages over conventional antenna assemblies. For instance, collocated coils can reduce the length of the resistivity logging tool, and collocated coils can operate at one or more frequencies simultaneously or sequentially. The symmetrical soft magnetic bands described herein are able to preserve the dipole orientation of collocated tilted and coaxial coils, and simultaneously improves the gain, inductance, and sensitivity of the associated antenna assembly. Moreover, the inserts used in the presently-described symmetric soft magnetic bands are simple and relatively inexpensive to fabricate. Lastly, while the antenna assemblies have been described herein with respect to MWD and/or LWD applications, it will be appreciated that the principles of the present disclosure are equally applicable to antenna assemblies (i.e., transmitters and/or receivers) permanently deployed behind casing, for example, and forming part of a reservoir monitoring system.

Embodiments disclosed herein include:

A. An antenna assembly that includes a tool mandrel having a tool axis, a plurality of coils collocated about the tool mandrel and each including a plurality of windings wrapped about the tool mandrel, and a soft magnetic band radially interposing the plurality of coils and the tool mandrel and including a plurality of inserts that form two or more annular arrays axially spaced from each other and extending about the tool mandrel at an angle orthogonal to the tool axis, wherein the inserts in each annular array are circumferentially spaced from each other.

B. A method of assembling an antenna assembly that includes positioning a soft magnetic band about a circumference of a tool mandrel having a tool axis, wherein the soft magnetic band includes a plurality of inserts that form two or more annular arrays axially spaced from each other and extend about the tool mandrel at an angle orthogonal to the tool axis, and wherein the inserts in each annular array are circumferentially spaced from each other, and collocating a plurality of coils about the tool mandrel such that the soft magnetic band radially interposes at least a portion of the plurality of coils.

C. A method that includes introducing a resistivity logging tool into a wellbore, the resistivity logging tool including an antenna assembly that includes a tool mandrel having a tool axis, a plurality of coils collocated about the tool mandrel and each including a plurality of windings wrapped about the tool mandrel, and a soft magnetic band radially interposing the plurality of coils and the tool mandrel and including a plurality of inserts that form two or more annular arrays axially spaced from each other and extending about the tool mandrel at an angle orthogonal to the tool axis, wherein the inserts in each annular array are circumferentially spaced from each other. The method further includes obtaining measurements of a surrounding subterranean formation with the resistivity logging tool.

Each of embodiments A, B, and C may have one or more of the following additional elements in any combination: Element 1: wherein the plurality of coils comprises two tilted coils collocated about the tool mandrel and azimuthally offset from each other by 180°. Element 2: wherein the plurality of coils comprises three tilted coils collocated about the tool mandrel and azimuthally offset from each other by 120°. Element 3: wherein the plurality of coils comprises at least one tilted coil collocated with a coaxial coil. Element 4: wherein the soft magnetic band comprises a material selected from the group consisting of a ferrite, mu-metal, permalloy, metallic glass, and any combination thereof. Element 5: wherein the plurality of inserts comprise at least one of an arcuate square, an arcuate rectangle, and a cylindrical member. Element 6: wherein the two or more annular arrays are axially spaced from each other along the tool axis by an axial gap that extends perpendicular to the tool axis. Element 7: wherein each insert in each annular array is circumferentially spaced from angularly adjacent inserts by an angular gap extending parallel to the tool axis. Element 8: further comprising a protective shield coupled to the tool mandrel and encompassing the plurality of coils and the soft magnetic band. Element 9: wherein the protective shield defines a plurality of holes aligned in one or more annular hole arrays extending about the tool mandrel orthogonal to the tool axis.

Element 10: wherein collocating the plurality of coils about the tool mandrel comprises collocating two tilted coils that are azimuthally offset from each other by 180°. Element 11: wherein collocating the plurality of coils about the tool mandrel comprises collocating three tilted coils that are azimuthally offset from each other by 120°. Element 12: wherein collocating the plurality of coils about the tool mandrel comprises collocating at least one tilted coil with a coaxial coil. Element 13: further comprising coupling a protective shield to the tool mandrel and thereby encompassing the plurality of coils and the soft magnetic band, wherein the protective shield defines a plurality of holes aligned in one or more annular hole arrays extending about the tool mandrel orthogonal to the tool axis. Element 14: further comprising tuning the soft magnetic band to optimize a magnetic dipole moment of at least one of the plurality of coils. Element 15: wherein tuning the soft magnetic band comprises at least one of varying a size of an axial gap defined between axially adjacent annular arrays and varying an angular gap that circumferentially spaces angularly adjacent inserts. Element 16: wherein tuning the soft magnetic band comprises altering a number or size of the plurality of inserts.

Element 17: wherein the tool mandrel is operatively coupled to a drill string and introducing the resistivity logging tool into the wellbore further comprises extending the resistivity logging tool into the wellbore on the drill string, and drilling a portion of the wellbore with a drill bit secured to a distal end of the drill string. Element 18: wherein introducing the resistivity logging tool into the wellbore further comprises extending the resistivity logging tool into the wellbore on wireline as part of a wireline instrument sonde.

By way of non-limiting example, exemplary combinations applicable to A, B, and C include: Element 8 with Element 9; Element 10 with Element 11; Element 10 with Element 12; Element 10 with Element 13; Element 10 with Element 14; Element 14 with Element 15; and Element 14 with Element 16.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. An antenna assembly, comprising:
    a tool mandrel having a tool axis;
    a plurality of coils collocated about the tool mandrel and each including a plurality of windings wrapped about the tool mandrel; and
    a soft magnetic band radially interposing the plurality of coils and the tool mandrel and including a plurality of inserts that form two or more annular arrays axially spaced from each other and extending about the tool mandrel at an angle orthogonal to the tool axis, wherein the inserts in each annular array are circumferentially spaced from each other,
    wherein the two or more annular arrays are axially spaced from each other along the tool axis by an axial gap that extends perpendicular to the tool axis, and wherein the antenna assembly further comprises an insulation material disposed within the axial gap.

2. The antenna assembly of claim 1, wherein the plurality of coils comprises two tilted coils collocated about the tool mandrel and azimuthally offset from each other by 180°.

3. The antenna assembly of claim 1, wherein the plurality of coils comprises three tilted coils collocated about the tool mandrel and azimuthally offset from each other by 120°.

4. The antenna assembly of claim 1, wherein the plurality of coils comprises at least one tilted coil collocated with a coaxial coil.

5. The antenna assembly of claim 1, wherein the soft magnetic band comprises a material selected from the group consisting of a ferrite, mu-metal, permalloy, metallic glass, and any combination thereof.

6. The antenna assembly of claim 1, wherein the plurality of inserts comprise at least one of an arcuate square, an arcuate rectangle, and a cylindrical member.

7. The antenna assembly of claim 1, wherein each insert in each annular array is circumferentially spaced from angularly adjacent inserts by an angular gap extending parallel to the tool axis.

8. The antenna assembly of claim 1, further comprising a protective shield coupled to the tool mandrel and encompassing the plurality of coils and the soft magnetic band.

9. The antenna assembly of claim 8, wherein the protective shield defines a plurality of holes aligned in one or more annular hole arrays extending about the tool mandrel orthogonal to the tool axis.

10. A method of assembling an antenna assembly, comprising:
    positioning a soft magnetic band about a circumference of a tool mandrel having a tool axis, wherein the soft magnetic band includes a plurality of inserts that form two or more annular arrays axially spaced from each other and extend about the tool mandrel at an angle orthogonal to the tool axis, wherein the inserts in each annular array are circumferentially spaced from each other, wherein the two or more annular arrays are axially spaced from each other along the tool axis by an axial gap that extends perpendicular to the tool axis;
    disposing an insulation material within the axial gap; and
    collocating a plurality of coils about the tool mandrel such that the soft magnetic band radially interposes at least a portion of the plurality of coils.

11. The method of claim 10, wherein collocating the plurality of coils about the tool mandrel comprises collocating two tilted coils that are azimuthally offset from each other by 180°.

12. The method of claim 10, wherein collocating the plurality of coils about the tool mandrel comprises collocating three tilted coils that are azimuthally offset from each other by 120°.

13. The method of claim 10, wherein collocating the plurality of coils about the tool mandrel comprises collocating at least one tilted coil with a coaxial coil.

14. The method of claim 10, further comprising coupling a protective shield to the tool mandrel and thereby encompassing the plurality of coils and the soft magnetic band, wherein the protective shield defines a plurality of holes aligned in one or more annular hole arrays extending about the tool mandrel orthogonal to the tool axis.

15. The method of claim 10, further comprising tuning the soft magnetic band to optimize a magnetic dipole moment of at least one of the plurality of coils.

16. The method of claim 15, wherein tuning the soft magnetic band comprises at least one of varying a size of the axial gap defined between axially adjacent annular arrays and varying the angular gap that circumferentially spaces angularly adjacent inserts.

17. The method of claim 15, wherein tuning the soft magnetic band comprises altering a number or size of the plurality of inserts.

18. A method, comprising:
  introducing a resistivity logging tool into a wellbore, the resistivity logging tool including an antenna assembly that includes:
    a tool mandrel having a tool axis;
    a plurality of coils collocated about the tool mandrel and each including a plurality of windings wrapped about the tool mandrel; and
    a soft magnetic band radially interposing the plurality of coils and the tool mandrel and including a plurality of inserts that form two or more annular arrays axially spaced from each other and extending about the tool mandrel at an angle orthogonal to the tool axis, wherein the inserts in each annular array are circumferentially spaced from each other, wherein the two or more annular arrays are axially spaced from each other along the tool axis by an axial gap that extends perpendicular to the tool axis, and wherein the antenna assembly further includes an insulation material disposed within the axial gap; and
  obtaining measurements of a surrounding subterranean formation with the resistivity logging tool.

19. The method of claim 18, wherein the tool mandrel is operatively coupled to a drill string and introducing the resistivity logging tool into the wellbore further comprises:
  extending the resistivity logging tool into the wellbore on the drill string; and
  drilling a portion of the wellbore with a drill bit secured to a distal end of the drill string.

20. The method of claim 18, wherein introducing the resistivity logging tool into the wellbore further comprises extending the resistivity logging tool into the wellbore on wireline as part of a wireline instrument sonde.

* * * * *